W. A. TUCKER.
ANIMAL TRAP.
APPLICATION FILED OCT. 15, 1915.
1,185,452.
Patented May 30, 1916.
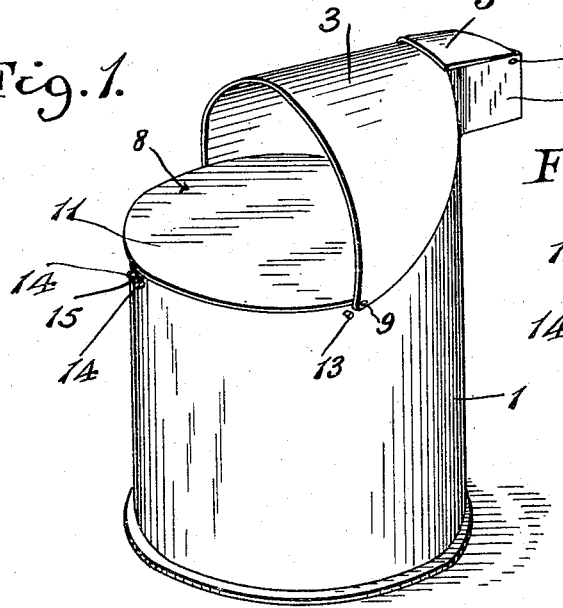
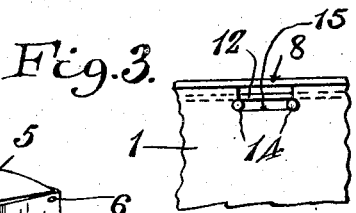
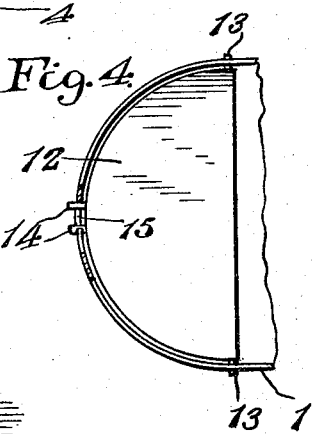
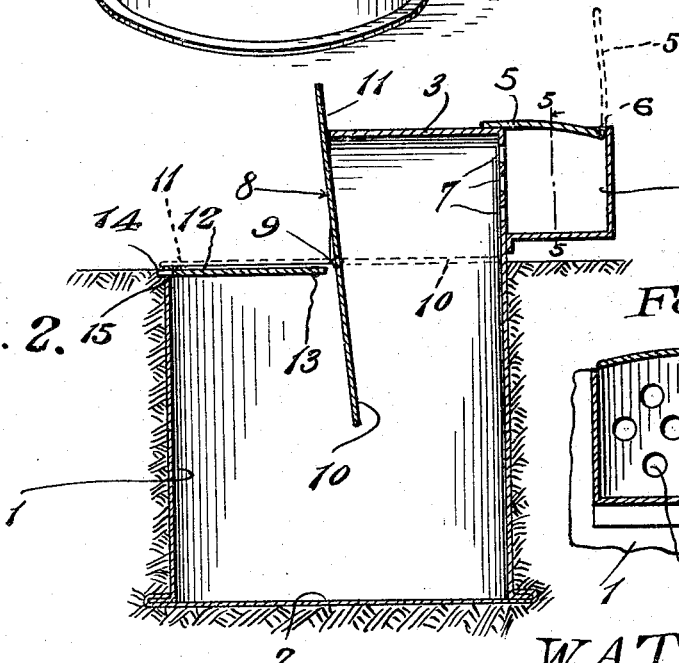
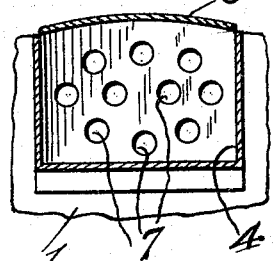
Inventor
W. A. Tucker

UNITED STATES PATENT OFFICE.

WOOSTER A. TUCKER, OF NEVADA, OHIO.

ANIMAL-TRAP.

1,185,452. Specification of Letters Patent. Patented May 30, 1916.

Application filed October 15, 1915. Serial No. 56,034.

*To all whom it may concern:*

Be it known that I, Wooster A. Tucker, a citizen of the United States, residing at Nevada in the county of Wyandot and State of Ohio, have invented certain new and useful Improvements in Animal-Traps; and I do hereby declare the following to be a full, clear, and exact description of the invention, such as will enable others skilled in the art to which it appertains to make and use the same.

This invention relates to animal traps, and one of the principal objects of the invention is to provide a trap of simple construction which will be automatically set after catching an animal, and in which the bait will not be consumed by the animal caught.

The foregoing and other objects may be attained by means of the construction illustrated in the accompanying drawing, in which—

Figure 1 is a perspective view of an animal trap made in accordance with this invention, Fig. 2 is a central vertical section taken through the same after it has been placed in a hole in the ground, and showing the pivoted trap door swung into vertical position, and the bait compartment door being opened, as shown in dotted lines, Fig. 3 is a detail view of the spring latch for the cover, Fig. 4 is a detail top plan view of the cover and latch therefor, Fig. 5 is a detail sectional view taken on the line 5—5 of Fig. 2 looking in the direction indicated by the arrow.

Referring to the drawing, the numeral 1 designates the body of the trap, which is preferably formed of sheet metal, and which may be round or other shape in cross section. The body portion 1 is provided with a suitable bottom 2, and this body portion may be water-tight and may contain a quantity of water if desired for certain classes of animals.

Projecting from the top of the body portion 1 of the trap is a hood 3 which covers substantially one-half of the body portion 1. Connected to the hood 3 is a bait compartment 4 having a cover 5 pivoted or hinged at 6 and adapted to drop over the hood 3, as shown in Fig. 2 of the drawing. A number of perforations 7 in the back portion of the hood communicate with the interior of the bait receptacle 4.

The trap door 8 is pivoted upon pintles 9 which extend through holes in the body portion 1, said pintles being disposed a little to one side of the center of the trap door 8 so that the door will normally drop in a horizontal position, but when an animal steps upon the portion 10 which covers the opening in the body portion 1 of the trap, the trap door will be swung upon the pintles 9 to deposit the animal within the body portion 1 of the trap. Normally the trap door covers the opening in the body portion and lies in a horizontal plane, the outer portion 11 resting upon a cover 12 which is pivoted or hinged at 13 to the body portion of the trap and at the front end said cover is provided with spring latch members 14 which are of a flexible nature and which engage a recess 15 at the top of the body portion 1, providing means for removing animals from the body portion after they have become trapped therein, by pressing the spring latch members 14 in the direction of each other, the cover 12 may be raised to a vertical position, giving free access to the interior of the body portion 1.

From the foregoing it will be obvious that bait may be placed in the receptacle 4, and can be of such character as will draw the animal by the scent of the bait, that the trap may be of the size to be placed upon a barrel or box, or may be placed in a hole in the ground with the top surface of the trap door practically on a level with the ground, and the trap may be of a size to catch any animal.

Various changes may be made in the details of construction without departing from the spirit and scope of the invention as defined in the claims.

What is claimed is:

1. An animal trap comprising a body portion having a bottom thereto and adapted to contain water, a hood projecting over the top of one portion of the body of the trap, a bait receptacle connected to said hood, said bait receptacle having a hinged cover and said hood being provided with a perforated wall communicating with said bait receptacle, a pivoted trap door in the top of the body portion of the trap, said trap door normally assuming a horizontal position, a cover underneath the front portion of the trap door, said cover being hinged to the body of the trap and provided with a spring catch on its front portion.

2. An animal trap comprising a cylindrical body portion, a bottom secured to said body portion, a hood having a rear perforated wall secured to the upper end of said body portion and adapted to overlie one-half of the body portion, a bait compartment secured to the rear wall of the hood, a horizontal trap door pivoted to the body portion at points adjacent the open end of said hood, said door adapted to swing to a substantially vertical position and abut the open end of the hood to prevent the escape of any animal after it has stepped upon the inner end of said door, a cover hinged to said body portion adjacent the pivoted point of said door and adapted to close one side of the body portion when the door is in a vertical position, and means for detachably securing the outer end of the cover to said body portion.

In testimony whereof I affix my signature in presence of two witnesses.

WOOSTER A. TUCKER.

Witnesses:
O. V. RILEY,
W. A. WOLFE.

Copies of this patent may be obtained for five cents each, by addressing the "Commissioner of Patents, Washington, D. C."